United States Patent [19]

Keithley

[11] 3,927,615

[45] Dec. 23, 1975

[54] PRESSURE-TIME RESPONSIVE ELECTRONIC DEVICE

[75] Inventor: Joseph F. Keithley, Cleveland Heights, Ohio

[73] Assignee: The United States of America as represented by the Secretary of the Navy, Washington, D.C.

[22] Filed: Sept. 12, 1950

[21] Appl. No.: 184,506

[52] U.S. Cl. .................. 102/18; 102/16
[51] Int. Cl.[2] .................. F42B 22/26
[58] Field of Search .................. 102/7, 16, 16 T, 18

[56] References Cited

FOREIGN PATENTS OR APPLICATIONS 557,110 4/1923 France .................. 102/16

*Primary Examiner*—Verlin R. Pendegrass

EXEMPLARY CLAIM

1. A pressure-time responsive integrating device operable in response to a negative pressure differential signal to integrate said signal under varying magnitude conditions through a predetermined time interval, which comprises pressure sensitive means operative in response to a change in negative pressure, an electrical circuit including a power source and a plurality of sequentially connected switch elements constructed and arranged to operate in sequential order in response to actuation by said pressure sensitive means, said circuit also including a gas tube having a starter anode therein and arranged to be fired after a predetermined pressure differential signal is detected by the pressure sensitive means and after closing of one or more of the switch elements of the circuit, said circuit also including a resistance-capacitance filter circuit therein, said filter circuit including a capacitor and a plurality of resistances of varying values with one each of said resistances connected through one of the plurality of switches in a series relationship with the capacitor whereby upon closing of the switch elements by the pressure sensitive means, a current is caused to flow from said power source through a first resistance to produce a charge on the capacitor and in which upon closing of one or more additional switch elements the current flow is through the additional switch elements to a resistance of less value than said first resistance to thus produce capacitor charging at a higher rate, the capacitor being connected to the starting anode of the gas tube in a manner whereby the building up of sufficient charge on the capacitor will produce firing of the gas tube.

15 Claims, No Drawings

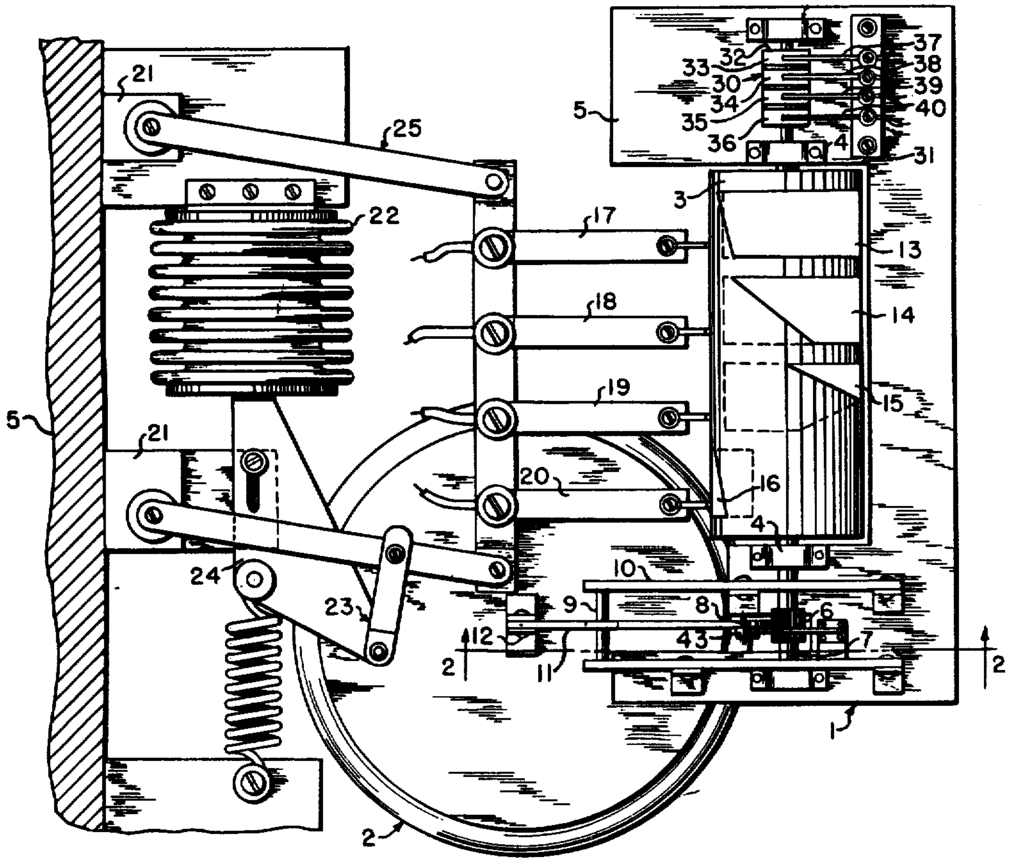

Inventor

J. F. KEITHLEY

By T. D. O'Brien
R. M. Hicks

Attorneys

Inventor

J. F. KEITHLEY

By G. D. O'Brien

R. M. Hicks

Attorneys

Inventor

J. F. KEITHLEY

By G. D. O'Brien
R. M. Hicks

Attorneys

PRESSURE-TIME RESPONSIVE ELECTRONIC DEVICE

STATEMENT OF GOVERNMENT INTEREST

The invention described herein may be manufactured and used by or for the Government of the United States of America for Governmental purposes without the payment of any royalties thereon or therefor.

This invention relates to a differential pressure sensitive marine mine, controlled in its firing by a time delay system cooperating with suitable fluid actuated means whereby the mine is capable of discrimination between wave pressure amplitude differences with respect to static head conditions as caused by the passing of a ship thereover, and those created by tides, waves, winds, shallow draft vessels and mine sweeping or countermining means. This invention makes advantageous use of the negative differential pressure peak under the bow of a moving ship to activate the control apparatus thereof and thereafter to actuate the firing system whereby the mine will be detonated as the ship passes thereover. The firing of a mine embodying this invention is intended to be limited to the immediate vicinity above the mine.

Wide ineffective athwartship firing inherent with prior firing systems is minimized by the localized nature of the high amplitude negative pressure peak to which these systems are sensitive and the consequential lack of reliable operation of the control systems to the wave pattern athwartship.

It is well known that a ship passing over the surface of a body of water produces a pressure field on the bed of the body and it is in the proper utilization of certain characteristics of this pressure field wave pattern that the present invention depends for its sensitivity and reliability of function.

The pressure components of the mine actuation device operate on a principle well known as Bernoulli's theorem which states that an increase in the rate of flow of a fluid is accompanied by a reduction in the pressure thereof. The application of Bernoulli's theorem lies in the fact that the rapid flow of water under a moving surface ship is accompanied by a resultant lowering of pressure thereunder. This negative pressure region extends several beams athwartship, but decreases progressively as the distance athwartship is increased. It will be obvious from considerations of the characteristics of a ship's signature that a system placed directly beneath the keel experiences greater reduction in pressure than a system placed some distance athwartship.

Accordingly the pressure sensitive devices of this invention are adapted to operate in the region of negative pressure of the pressure field of the signature of a vessel moving through water adjacent thereto. It may be stated that generally under constant depth conditions the pattern of the pressure signature of a vessel remains unchanged as the vessel moves. Under varying depth conditions, the magnitude of the pressures therein involved are subject to change but the general pattern remains unchanged. In such cases the pressures vary substantially inversely as the square of the depth. The general pattern is unchanged in its essential nature by variations or changes in speed except that in consequence of changes to lower speeds the magnitude of the pressures involved are directly proportional to the square of the speed.

Any means used in accomplishing the arming and firing of a marine mine having as its basic principle of actuation initiation, a sensitivity to differential wave pressures and means responsive to pressure changes therein, must, in order to be effective against ships and yet unaffected by extraneous conditions of a similar nature but of slightly different characteristic, be capable of discrimination against such influences as, for example, the hereinbefore mentioned wake pattern of small shallow draft vessels, pressure changes produced in the pressure field by tidal action, waves, mine sweeping, or countermining operations and on occasion by changes induced by high winds. The apparatus of this invention while sensitive to such conditions in the sense that it will detect and react to them, will not function to be detonated thereby but will upon partial activation by said influences, later re-cycle itself to prevent its detonation while remaining continuously sensitive and responsive to the ship's signature of larger vessels.

While the mine incorporating the present invention is intended for use at various depths such, for example, as depths approximating 40 ft. to 120 ft. the device is nevertheless capable of providing its discriminating function when used at greater depths. This is due to the fact that while the sensitivity of the mine is lessened as a result of magnitude decreases of signature pressures with depth, the magnitudes of the pressures induced by the extraneous influence are likewise decreased to the same extent.

One of the particular functions of the pressure sensitive elements of the fluid circuit is to filter out slow changes in pressure produced in the pressure field adjacent the mine by tidal action. Another function is to transmit rapid changes in pressure, caused by the passage of a vessel over the mine directly, to a pressure responsive element thereof, irrespective of its depth of submergence. The functioning of the fluid filter circuit is analogous to an electrical R.C. high pass filter circuit hereinafter discussed in greater detail.

In carrying out the second above mentioned function, the pressure change responsive elements effect the measurement of the magnitude of the negative pressure signature wave, and thereafter coact with a timing means of the apparatus to provide an integration of this wave pattern between the minimum value to which sensitivity is present and the value predetermined as the firing point for the detonation means. Thus by proper integration of the negative wave pattern the desired discrimination between wave background and ship pattern effects can be provided. The required degree of accuracy to which this integral must be measured is within the operational characteristics of the herein disclosed device and is such that this essential discrimination as well as discrimination in detonation between athwartship firing and firing directly under the ship can be accomplished satisfactorily.

Analysis of wave data and ship contours indicate that a workable approximation over the normal range of ship speeds can be made by proper evaluation of the data as hereinafter set forth. Assuming, for example, that the wave area enclosed by a curve $\Delta p = f(t)$; wherein $\Delta p$ is a pressure increment and $t$ represents time in seconds. Measurements have shown that the ordinate $\Delta p$ of a ship's signature at any given point along the ship is directly proportional to the square of the ship's velocity, and for larger ships, with which this invention is concerned, traveling at speeds up to 15 knots; $\Delta p = Kv^2$, from which the expression $$\int_{t_1}^{t_2} \sqrt{\Delta p}\, dt = B$$

follows in which $t_1$ and $t_2$ are so chosen that only the area when the pressure is negative is included in the integral as it defines a quantity B, which is independent of the ship's speed. The magnitude thereof, varies however with the position of the profile chosen; the keel profile generally having the greatest magnitude. For ships larger than destroyers, B is greater than any surface waves measured heretofore. The basis therefore by which discrimination between waves and ships is effected lies in the evaluation of this integral. In selecting a value of B for operation of the mine, one should be determined which when exceeded will cause firing. If a value of B sufficient to cause firing is not reached during the period of negative differential, the mechanism will be restored to its original condition during the following period of positive pressure differential. In this manner of operation a number of small waves, to which the system is sensitive, will not be added together and result in a sufficient B value to fire the mine.

In evaluating B of the above equation it is necessary to measure the magnitude of the negative differential and its duration. This mechanism is intended to perform a continuous integration, wherein a timing mechanism, adapted to be actuated as the differential pressure drops below zero value corresponding to the normal hydrostatic pressure at the depth of submersion of the mine, continually follows the square root of the differential pressure amplitude thereby measuring the required area exactly and causing mine firing when the required area of B is reached.

In utilizing this negative differential pressure region, several differential pressure indicators, hereinafter referred to as the detector mechanism, and associated time delay devices are incorporated in a new and novel manner as hereinafter set forth in detail to accomplish the following objects.

One object of the invention resides in the provision of a new and improved mine firing control system which is adapted to become armed for a predetermined interval in response to a first pressure differential signal, and to be fired if a second signal is received during the first predetermined interval, and in which means are provided for restoring the system to an initial or unarmed condition in the event a second pressure signal is not received during the predetermined interval.

Another object of the invention is to provide a mine firing control system of the type herein disclosed in which the sensitivity of the system is automatically adjusted in accordance with the depth of submergence of the mine.

Another object is to provide within a mine of this type a new and improved fluid controlled circuit adapted to respond selectively to changes in the pressure field adjacent the mine.

A further object resides in the provision of new and improved means for substantially filtering out or nullifying the effects of tides and waves upon the firing mechanism of a pressure controlled marine mine.

An additional object lies in the provision of a new and improved pressure controlled mine which will not be subject to discharge by mine sweeping apparatus and countermining means.

A still further object lies in the provision of a new and improved mine firing control system wherein the system operates to detonate and explode the mine associated therewith in response to the movement of a surface vessel within the zone of destructivity of the mine.

These and other objects, which will appear or be obvious from the hereinafter set forth description, are accomplished in the system of the present invention which incorporates a pressure change sensitive circuit closing means or detector mechanism and electronically controlled timing means cooperating therewith in the arming and detonating actions of the mine; reference being made herein to the following complete description and the several figures of the drawings which are shown for purpose of illustration but with reference to which are shown for purpose of illustration but with reference to which the invention is not intended to be limited except in terms of the language of the appended claims, since obvious modifications will be apparent to those skilled in the art wherein:

Figure 1:
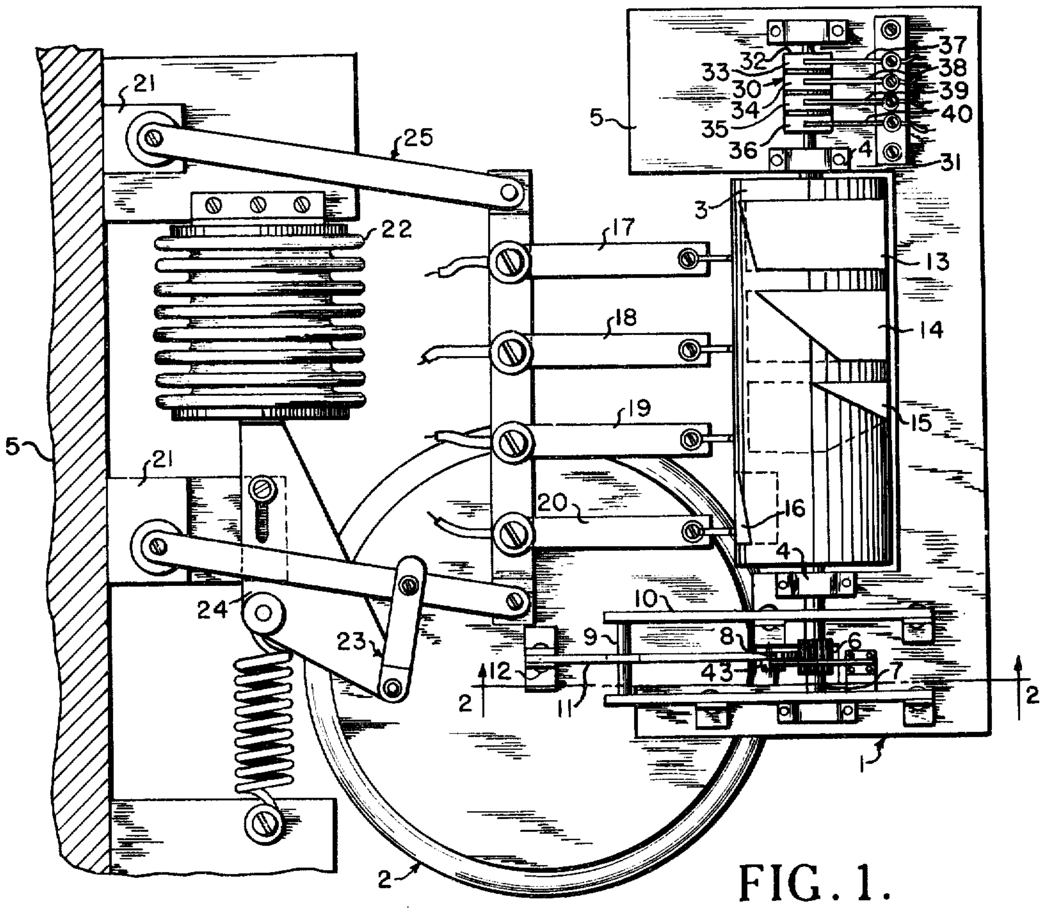
FIG. 1 is a plan view of a hydrostatic bellows driven switch drum assembly on which is shown the depth compensating bellows drive for the switch contacts.

Referring now in more detail to the figures of the drawing in which like reference characters refer to like parts, on FIG. 1 is shown a pressure responsive switch means assembly generally at 1 with the switch drive bellows at 2. This assembly includes a switch drum 3 supported by bearings 4 on a support 5 and arranged for rotation by means of a pinion gear 6 mounted on the shaft extension 7. The pinion 6 is engaged for driving movement by a pivotally supported arcuate rack 8 supported from the bracket 10 by a pivot shaft 9. This rack member is arranged in a leverage arrangement with the extension 11 attached to the upper portion of the bellows 2 and pivotally connected at 12 in a manner whereby expansion or contraction of the bellows member will produce driving motion capable of rotating the switch drum 3. The switch drum is arranged with four non-continuous band sections 13, 14, 15 and 16 respectively. Three of these have the leading edge tapered with respect to the longitudinal axis of the switch roller drum. The contacting members 17, 18, 19 and 20 which are arranged to engage the banded sections of the switch drum and are moveably supported from a parallel arm arrangement 25 supported at 21. This arrangement includes a depth compensating bellows 22 connected by a linkage assembly shown generally at 23 to drive a spring return arm 24 and shift the contact member support axially with respect to the points of contact on the drum surface. This arrangement is such that it will provide for a change in initial position of contact of the banded sections upon a corresponding shift of the compensating bellows. One end of each of the bellows members 2 and 22 is restrained.

Figure 2:
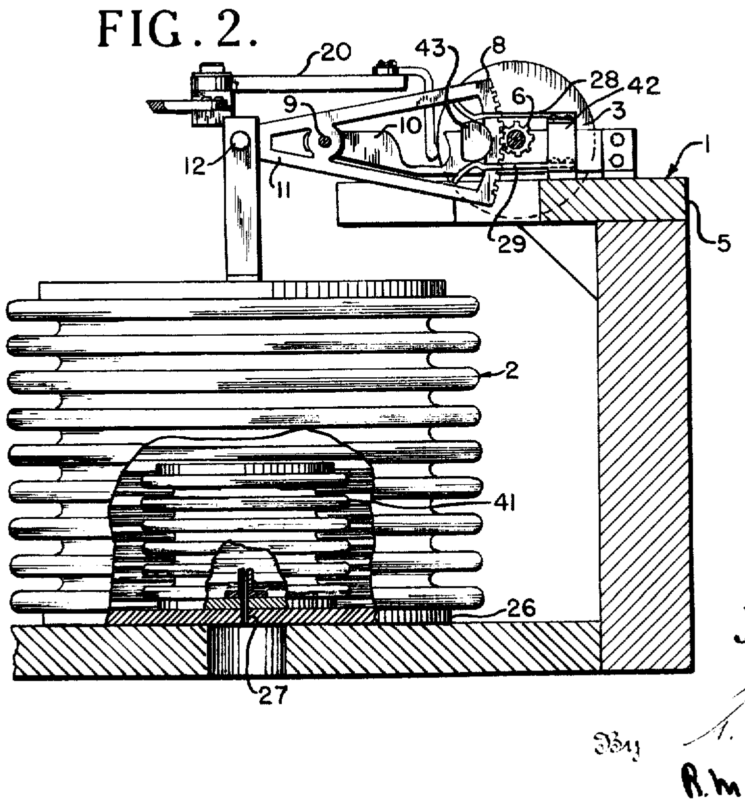
FIG. 2 is a view taken along the line 2—2 of FIG. 1 partially broken away and showing the switch contact drum drive means in relationship with the differential pressure bellows.

With reference to FIG. 2 the dual bellows assembly 2 of FIG. 1 shows generally the details of the high pass filter system enclosed therein. This bellows 2 is restrained at 26 by the frame or support assembly 5. This bellows assembly is arranged in the mine in a manner not shown, whereby the bellows is in communication externally with the sea water.

The filter arrangement includes an inner bellows 41 disposed within the bellows 2 and in communication interiorly with a capillary orifice 27 for the purpose of balancing, after submersion of the mine, the internal and external pressures on the outer bellows thereby to compensate for low frequency pressure due to tide effects. The space between the two bellows units is preferably filled with air under pressure. Also, if desired an additional bellows similar to bellows 41 may be in communication interiorly with the orifice 27 and exposed exteriorly to the sea water, the space within these bellows being preferably filled with a fluid suitable for the purpose such, for example, as a hydraulic fluid. The drive assembly associated with this bellows as hereinbefore set forth is arranged to have the arcuate rack returned to a neutral or normal position with respect to the drum pinion by a pair of springs 28 and 29. These springs are attached to a post 42 at one end, substantially as illustrated, and are arranged at the opposite ends to engage the opposite surfaces of a projection 43 on the side of and between the upper and lower members of the arcuate rack member 8.

Figure 3:
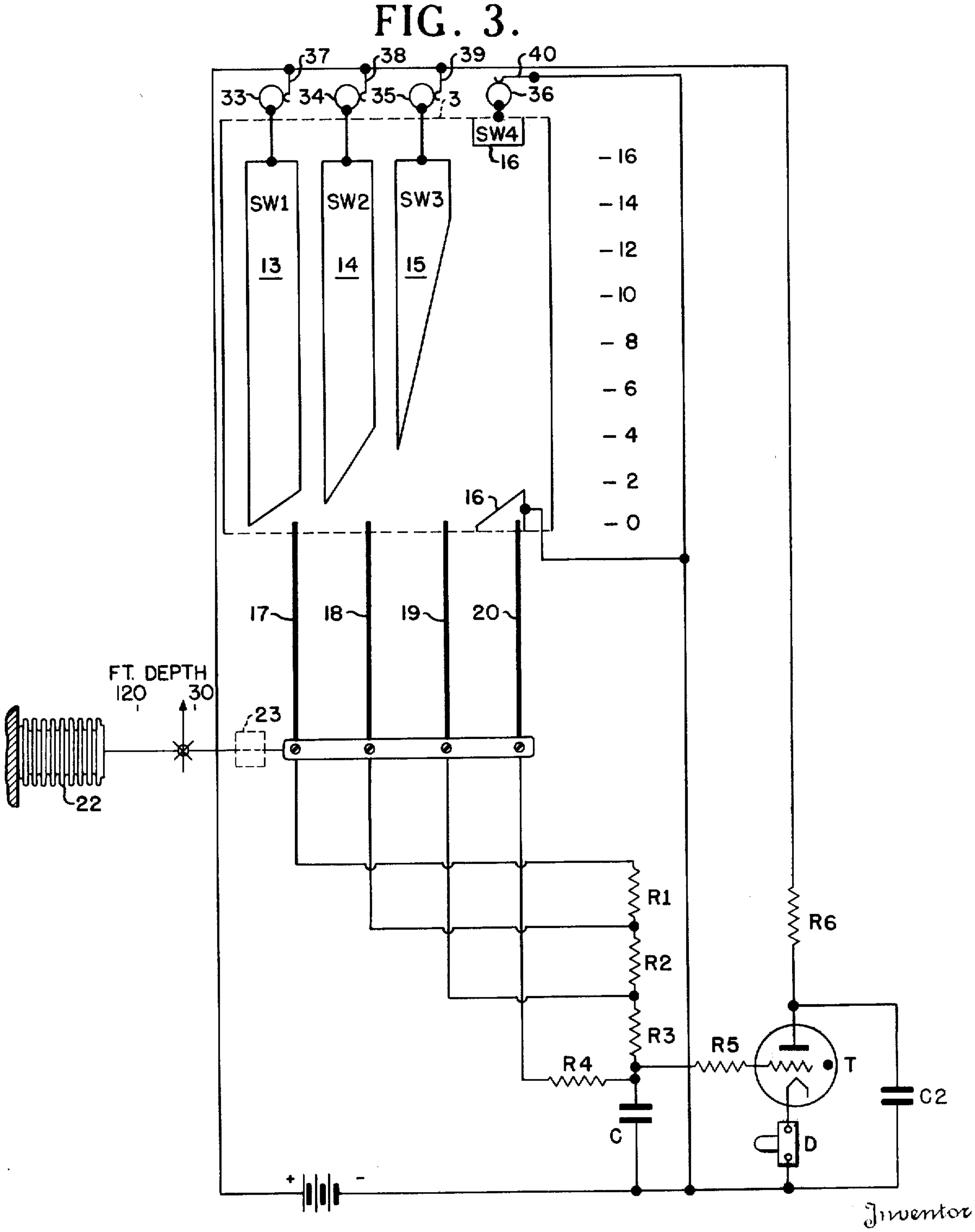
FIG. 3 is a schematic drawing of an electrical circuit suitable for use with the present invention on which is shown diagrammatically the means of compensating for the depth of submergence of the mine.

An arrangement for making electrical connections within the rotatable drum assembly of FIG. 1 to the contact surfaces thereof, respectively designated 13, 14, 15 and 16 is accomplished by bringing the respective leads, FIG. 3, from these contact surfaces and interiorly of the drum shaft to a slip-ring contact assembly shown generally at 30. The slip-ring assembly comprises a support structure 31 for the brushes, a slip-ring mounting drum 32 having thereon the slip rings 33, 34, 35 and 36 electrically connected respectively to the contact elements 13, 14, 15 and 16. The slip-ring brushes associated therewith are designated 37, 38 39 and 40. These elements are included in the circuit arrangement of FIG. 3.

Referring now more particularly to FIG. 3 the plurality of switches respectively designated SW1, SW2, SW3 and SW4 correspond respectively to switches 13, 14, 15 and 16 are are actuated by rapid pressure changes applied to the bellows assembly of FIGS. 1 and 2 in response to pressure differential changes transmitted thereto by ship motion. The switches of FIG. 1 are connected into an electronic timing circuit as, for example, that shown in FIG. 3. Four switches are shown in this circuit for the purposes of illustration, but it is to be understood that more than four may be incorporated therein, if desired, to obtain greater sensitivity of operation of the mine firing device. The normally closed switch SW4 of the circuit is employed to control a bleeder circuit which substantially short circuits the condenser C in the event that a circuit firing condition is not produced within a predetermined length of time. This switch SW4 operates to open position only on negative pressures, and is connected through resistance R4 across the condenser if a positive pressure signal exists.

In this circuit the condenser C is connected across the starter anode and cathode of a cold cathode tube T, and is charged through resistors R1, R2 and R3 upon closing respectively the switches SW1, SW2 and SW3. The closure of switch SW1 by a negative pressure signal at the bellows provides current flow through resistors R1, R2 and R3 to apply a positive voltage to the condenser. An increase in negative pressure subsequently causes rotation of the switch drum sufficiently to close the contacting surface of switch SW2 thereby shorting resistance R1 and providing a current path through resistances R2 and R3 only whereby the time required to charge the condenser C to a value necessary to fire the tube T is reduced.

A predetermined additional increase of the negative pressure will close switch SW3 thereby shorting resistances R1 and R2 whereby a more rapid rate of condenser charging is effected by reason of the inclusion of resistance R3 only in the charging circuit. Selective closing of these switches in sequential order causes the condenser to be charged at different rates by current flow from the positive terminal of the battery. The battery negative terminal is connected to the cathode of the gas tube T by way of detonator D and to one side of each of the condensers C and C2. Upon application by conduction, to the starter anode of the gas tube, of a condenser voltage sufficient to reach the ignition potential of the tube, the tube fires causing conduction between the cathode and the main anode and thereby firing the detonator D.

The detonator firing circuit of FIG. 3 includes a battery arranged to apply a positive voltage to the main anode of the firing tube T and to the normally charged condenser C2 by way of resistance R6 which is continuously connected to the positive battery terminal. This arrangement overcomes any possibility of uncertainty in firing of the tube and detonator D in the event that the battery had deteriorated through aging or otherwise. The firing potentials of a particular gas tube and variations from tube to tube as commercially available for use in this circuit do not impair the operation of the circuit since the voltage is applied to the tube by the condenser in addition to direct battery application. The detonator D of the circuit is connected between the cathode and battery negative. The resistance R5 is connected between the capacitor C and the starter anode of the gas tube.

Figure 4:
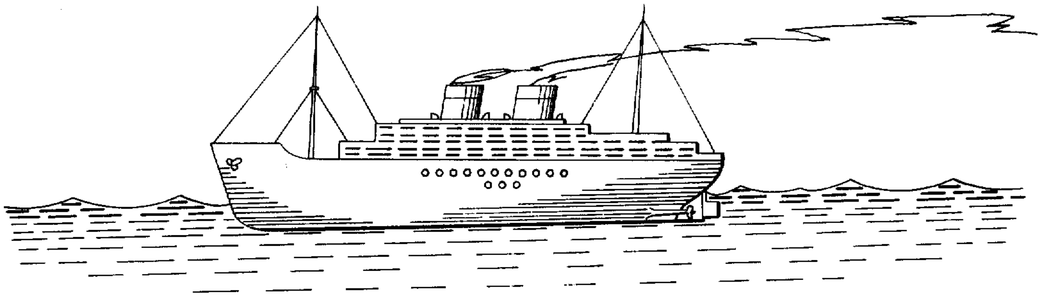
FIG. 4 is a view of the signatures of a ship moving through water.
Figure 4:
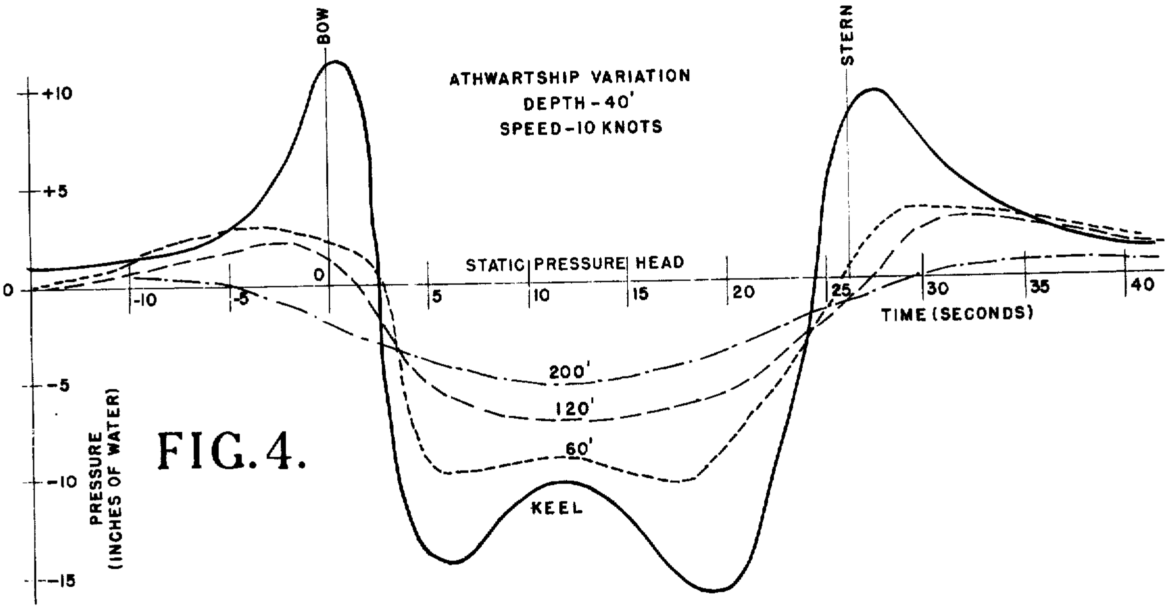
Figure 5:
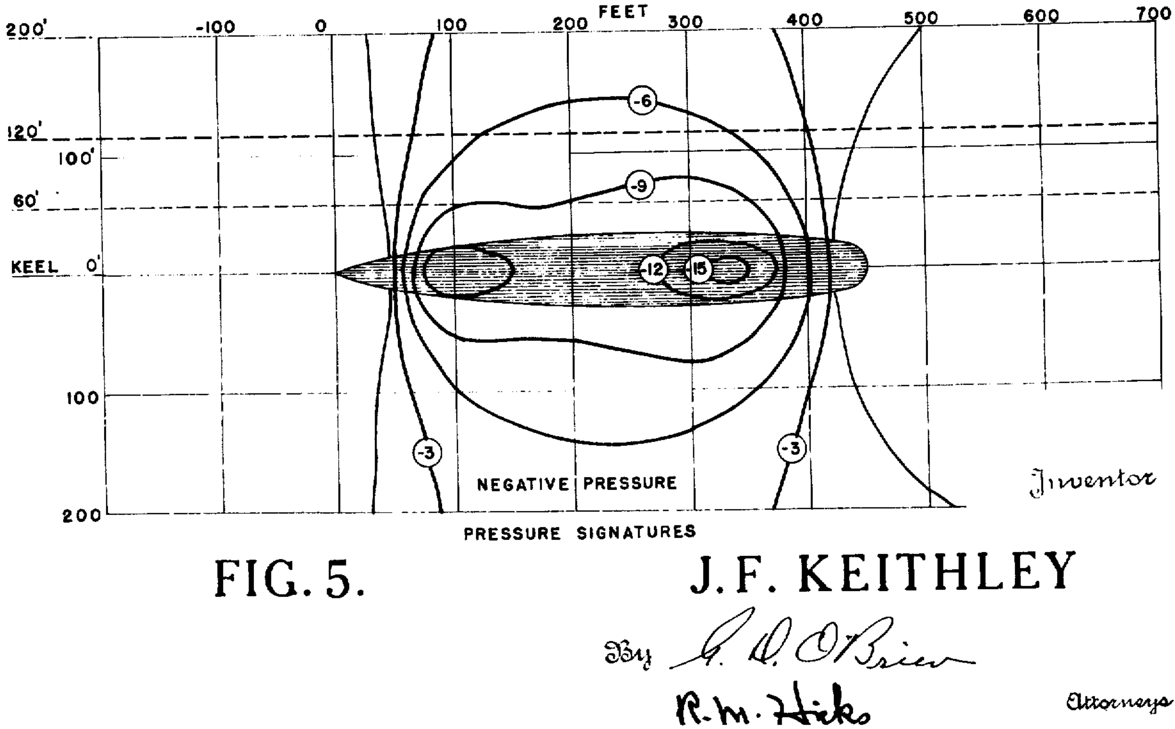
FIG. 5 is a graphical plan of the ship's signature of FIG. 4.

FIGS. 4 and 5 of the drawings illustrate a contour map and a signature profile therethrough of the pressure field on the bed of a body of water as a vessel passes thereover, the signature being that received by a system of the character herein disclosed when a mine comprising the system is submerged to a depth, for example, of 40 feet. As hereinbefore stated, a region of negative pressure exists beneath a vessel moving through water, the negative pressure area immediately beneath the vessel being shaded in FIG. 5. The negative pressure region, as measured in inches of water, extends several beams athwartship but decreases progressively as the distance athwartship is increased. The heavy lines -3, -6, -9, etc. illustrate the negative pressure in inches of water at various points in the field. The ship pressure signature shown in solid line in said FIG. 4 corresponds to a signature received by the system herein disclosed when the mine rests at a point directly below the keel of the vessel, while the signatures shown in dashed lines correspond to profiles at various distances athwartship. Thus it is obvious from these signatures that a system placed directly beneath the keel experiences a greater reduction in pressure than a system placed some distance athwartship. It will be recalled that, in general, the pattern of the pressure signature of a vessel under constant depth conditions remains unchanged as the vessel moves and, with changes in depth, the magnitude of the pressures involved vary substantially inversely as the square of the depth. With vessel speed changes the essential nature of the pattern is unchanged but for lower speeds the magnitude of the pressures involved are directly proportional to the square of the speed of the vessel.

Under ship's signature conditions which cause sufficient increase in the magnitude of the negative $\Delta p$ to reach a value negative $\Delta p_1$, the switch SW1 will be closed and simultaneously therewith the short circuiting switch SW4 opens to permit building up of a charge on condenser C. Continued increase in magnitude of pressure $\Delta p_1$ to a $\Delta p_2$ value will subsequently cause a closing of switch SW2. If the magnitude of pressure reaches a degree sufficient to cause the closing of switch SW3 the current flow to the condenser will be through R3 only and a firing potential applied therethrough to the tube will cause firing conduction through the tube to actuate the electroresponsive explosive device D. It is to be noted that this integrating system takes advantage of the fact that the ships to be destroyed have a value of B larger than the critical value, while most waves have a smaller value of B than the critical value; the device is thus able to differentiate between wave patterns and the pattern of large vessel signatures.

When the mine is planted at a depth in excess of a predetermined depth of submersion the pressure of the water applied exteriorly to bellows 22 causes the bellows to contract and move the linkage assembly 23 upwardly as viewed on FIG. 1 thereby extending the spring secured to arm 24. When this occurs the contact members 17, 18, 19 and 20 are moved axially along the surface of the switch drum 3 such that a smaller angular movement of the drum from the normal rest position thereof is required for the contact members 17, 18 and 19 to engage their respective contact sections 13, 14 and 15 mounted on the drum. As the pressure of the water increases with increased depth of submersion before the mine comes to rest on the bed of the body of water, the additional increase of upward movement of the contact arm assembly 23 to a new setting corresponding to the new depth of submersion causes engagement of the contact members with their respective contact bands with less angular movement of the drum assembly from the initial position thereof in response to a smaller increment of negative pressure resulting from the increased depth of submersion of the device. By employing the linkage assembly 23 and bellows 22 in the manner disclosed, the device is rendered suitable for use in varying depths of submersion in which the weakened signal from the vessel resulting from an increase in depth of the device is compensated for by the reduced amount of angular movement of the switch drum in response to the negative signal received from a vessel to effect engagement of the switching elements 17, 18 and 19 with their respective contact bands and disengagement of contact elements 20 with the associated contact band 16.

The graphic illustration of FIGS. 4 and 5 of the drawings show in detail the pressure changes caused at various positions along the bed of a body of water at a depth of 40 feet of a large vessel traveling at a speed of 10 knots. As a ship moves through the water a positive pressure peak is produced at the bow and stern while a negative pressure region is produced from aft of the bow to forward of the stern. It is the negative portion of this pressure region to which the integrating system of the present invention is sensitive and it is the purpose of this system to distinguish between waves produced by a vessel and sea waves.

Sea waves have been recorded which have positive pressure magnitudes equal to a vessel's positive pressure peak, but to date no waves have been recorded which have similar negative pressure regions of such long duration as, for example, about 15 seconds as seen in FIG. 4. The preferred embodiment of the instant invention is specifically adapted to respond to pressure changes caused by large vessels but the system may be modified by changing its sensitivity to respond to various other conditions where response to a different code or ratio of pressure signals is desired.

By analysis of available wave data and contour signature data a set of values may be established for ship selective operation of the device. As an example, the apparatus may be set to operate at −2 inches of differential pressure for the switch SW1, −5 inches for switch SW2, −15 inches for switch SW3. This setting will provide the desired large ship integration with proper wave and athwartship discrimination characteristics.

Although a marine mine detonator D has been chosen as the preferred embodiment of a current responsive device to be coupled to the discharge of the gas triode it will be understood that this invention is not limited to this specific arrangement since the pressure time responsive electronic device may be used to operate valves, gages and other current responsive devices which may be desirable as well as hydraulic or pneumatic systems.

Also any pressure responsive means such as diaphragms and the like may be used to transmit the changes in pressure to the switch operating means without departing from the scope of the instant invention, also other means of driving the depth compensating arrangement may be substituted therefor as will be evident to one skilled in the art.

It is noted that if a ship having a negative pressure region of greater magnitude than that taken in the example passes over the mine, it is not necessary that a time interval of 15 seconds pass before firing of the tube takes place since such a pressure signature is peculiar to large vessels only and is of a magnitude not encountered with wave forms. The integrating means therefor functions additionally as an accelerating means whereby a large signal received by the bellows will produce more rapid rotation of the switch drum to bring the switch SW3 into contact and produce current flow through the resistance R3 only of the circuit. Shorting out of the resistance R1 and R2 progressively increases the rate of current flow and thus decreases the time required for firing of the detonating means. This reduction of the resistance in the RC circuit of the tube allows the condenser to charge more rapidly and gas tube firing is the ultimate result thereof. This condenser charges quite rapidly upon closing of the switch SW3 and the tube is thus fired in a shorter time.

In the operation of this invention, the high amplitude negative differential peak under the middle portion of a ship moving through water directly over the mine will cause the differential pressure device to become active. Upon actuation of the first switch the timing circuit will become activated wherein firing will occur if during the period following the closing of the circuit activating switch the negative wave pressure continued to maintain this switch closed long enough to build up firing potential across C. If the amplitude is of sufficient magnitude to close and thereafter to maintain the second and third differential pressure switches closed such firing will occur earlier with SW1 and SW2 closed, and still earlier if all three of the switches are closed.

A ship is necessary to produce the high combination of negative pressure differential amplitude and time required for firing. Surface waves which might on occasion exist and be of sufficient magnitude to cause the switches to close will not, however, produce mine firing conditions for the reason that the negative pressure and time combination thereof is smaller than that of the ship signature and not sufficient for firing and hence the positive half cycle will recycle the switch mechanisms before timing out can occur.

The discrimination between ship movement and tide action is effected by the orifice and the inner bellows of the high-pass filter arrangement. The actions of tides on the device are of relatively long duration and compensation is accomplished by balancing the pressure between the air filled interior of the outer bellows and the sea pressure acting on the exterior surfaces thereof.

The high amplitude differential pressure region under the middle of a moving ship by reason of the magnitude thereof is thereby utilized to limit the athwartship firing and prevent firing from a train of surface waves.

Obviously many modifications and variations of the present invention are possible in the light of the herein set forth teachings. It is therefore to be understood that within the scope of the appended claims the invention may be practiced otherwise than as specifically described.

The invention described herein may be manufactured and used by or for the Government of the United States of America for governmental purposes without payment of any royalties thereon or therefor.

What is claimed as new and desired to be secured by Letters Patent of the United States is:

1. A pressure-time responsive integrating device operable in response to a negative pressure differential signal to integrate said signal under varying magnitude conditions through a predetermined time interval, which comprises pressure sensitive means operative in response to a change in negative pressure, an electrical circuit including a power source and a plurality of sequentially connected switch elements constructed and arranged to operate in sequential order in response to actuation by said pressure sensitive means, said circuit also including a gas tube having a starter anode therein and arranged to be fired after a predetermined pressure differential signal is detected by the pressure sensitive means and after closing of one or more of the switch elements of the circuit, said circuit also including a resistance-capacitance filter circuit therein, said filter circuit including a capacitor and a plurality of resistances of varying values with one each of said resistances connected through one of the plurality of switches in a series relationship with the capacitor whereby upon closing of the switch elements by the pressure sensitive means, a current is caused to flow from said power source through a first resistance to produce a charge on the capacitor and in which upon closing of one or more additional switch elements the current flow is through the additional switch elements to a resistance of less value than said first resistance to thus produce capacitor charging at a higher rate, the capacitor being connected to the starting anode of the gas tube in a manner whereby the building up of sufficient charge on the capacitor will produce firing of the gas tube.

2. A pressure-time integrating control system for a mine which is operable to arm and fire the mine in response to a pressure signal of predetermined magnitude and time characteristics as produced by a ship's pressure signature while the ship is moving thereover through the water, comprising a pressure sensitive device responsive to a predetermined value of negative pressure of a ship signature, a control circuit connected with said pressure sensitive device, which said circuit includes a power source, a plurality of switch means, a gas discharge tube of a type having a starter anode therein, a capacitor and a plurality of resistance elements wherein the resistance and capacitance elements are arranged to provide a trigger circuit wherein upon closing of one of the switch means current flows through one of the resistance elements to produce a charge on the capacitor whereby on application of sufficient charge to the capacitor discharge will take place to produce firing of the gas tube, the switch means of the system being connected in series in an arrangement to close in sequential order in response to pressure signals of predetermined degree of increase in signal magnitude, the resistance elements being connected in series with the second and succeedingly operated switch means which said resistance elements are of lesser value than the resistance associated with the first switch means, the circuit arrangement being sufficiently active upon increase in magnitude of the pressure signal that the time increment required to produce tube firing will be decreased to thus produce mine firing under integration of a predetermined pressure time signal.

3. A mine firing device operable to arm and fire a mine in response to a ship's pressure signature during the negative pressure region thereof of a predetermined magnitude and existing for a predetermined time, comprising, pressure sensitive means responsive to a predetermined negative pressure peak for initially activating the device, and integrating means responsive to actuation of said pressure sensitive means to provide discrimination between varying transient pressure signals under varying magnitude-time conditions to produce firing after a predetermined combination of pressure magnitude and time interval has been determined, thereby indicating a ship of desired size, a resistance-capacitance circuit included in said integrating means and operable in response to activation by said pressure sensitive means to produce mine firing action, and a gas tube in said circuit having a starter anode connected to the circuit capacitor and to produce the required activation for mine detonation as the tube is fired the response to a predetermined increase in the voltage of said capacitor.

4. The structure of claim 3 further characterized by the inclusion of a pressure change actuated means connected to the pressure sensitive means and operative in response to a pressure signal of decreasing magnitude from that which actuates the first pressure responsive device to function to recycle the control circuit to an initial condition if the pressure signal has not reached a predetermined magnitude time function value.

5. A pressure-time responsive integrating device operable in response to a predetermined pressure signal of a ship's signature to produce detonation of a mine following integration of a pressure-time signal, which device comprises, a bellows means, a drum-type multiple switch assembly operatively connected to be driven by the bellows, a plurality of switch elements in said drum assembly, a mine control circuit of the resistance-capacitance filter type, operatively connected to said plurality of switch elements in a manner to provide a plurality of time delay circuits a gas tube operatively connected to the output of said circuit to provide the firing for mine detonation, in response to a predetermined time-magnitude relationship as presented thereto by the mine control circuit and a detonating means connected in said mine control circuit and to the gas tube in a manner to produce mine firing in response to said predetermined pressure-time signal.

6. A pressure-time integrating device adapted to be immersed within a body of water and operable in response to a predetermined code of pressures such as produced by the pressure signature of a vessel moving thereover comprising, means responsive to a first signal of predetermined negative pressure caused by the vessel for rendering the device active, means for causing the continued operation of said device in response to continuation of said predetermined pressure signal for a predetermined minimum time interval, and electric circuit means including a plurality of sequentially actuated switches in said circuit means and operatively connected to said pressure responsive means for controlling the effective time interval of said signal in an inverse ratio to an increase in magnitude of the pressure signal whereby operation of the device will occur as a result of the integration to a predetermined time-magnitude function of the pressure signal.

7. A pressure-time discriminating and integrating device operable in response to a predetermined pressure signal of a ship's signature to produce detonation of a mine associated therewith following integration of a ship's signature pressure area to a predetermined time magnitude product which comprises, a resistance-capacitance circuit, a negative pressure actuated means, a plurality of differeing predetermined resistance elements included in said resistance-capacitance circuit, and a plurality of sequentially operated switch elements connected in time delayed relationship to said pressure actuated means and to said circuit through said differeing predetermined resistance elements for timing the device in response to a pressure signal varying through a pressure magnitude-time function value thereby to produce an actuation of the mine firing system selectively in accordance with the size and speed of the ship causing the pressure signal.

8. A pressure integrating device selectively responsive to a predetermined pressure code for operation thereof, comprising, a switch controlled electrical circuit having a source of electrical power, a plurality of sequentially operated switch elements included in said circuit, a plurality of serially connected resistance elements, each of said resistance elements being connected across the terminals of one each respectively of the plurality of switch elements in an arrangement for sequentially altering the value of resistance through which the current flows to an activating means of the circuit, said activating means comprising a capacitor and a gas triode of a type having a starter anode, wherein the capacitor is connected to control the starter anode and to fire the triode after a predetermined flow of current through the resistance elements sufficient to charge the capacitor, and detonating means operatively connected to the cathode of the gas triode and adapted to be actuated as the triode is fired.

9. A pressure responsive system selectively responsive to predetermined codes of pressures for operating in a mine detonating system, said pressure system comprising a switch controlled electrical circuit, pressure responsive switch actuating means, a multiple pole switch assembly having a plurality of contact terminals thereof arranged for sequential operation by said switch actuating means, and a second electrical circuit for mine detonation comprising, a plurality of resistance elements and a capacitor, a capacitor charging circuit, said elements being connected in a manner whereby sequential closing of said contact terminals of said switch assembly successively changes the effective value of the resistance in said charging circuit, a gas triode, and a detonating means, said gas triode having a starter anode therein, which is connected to receive a discharge from the capacitor thereby to cause firing across the main anode and cathode thereof, the main anode and cathode being connected to trigger the detonating means as the triode is fired.

10. The structure of claim 9 further including a second pressure responsive means arranged to react linearly to the depth of submergence of said mine detonating system thereby to compensate for depth of submergence thereof, and a linkage assembly connecting the second pressure responsive means to the switch terminal contacts thereby to provide an adjustment setting thereof for said depth compensation.

11. A pressure-time integrating device adapted to be immersed within a body of water and operable in response to a predetermined pressure signal integral of a ship's signature as it passes thereover and arranged within the mine to produce triggering of a mine detonator and detonation of the mine following integration of a varying pressure signal through a predetermined time-magnitude relationship, which device comprises, a bellows means, a multiple switch assembly operatively connected to said bellows and adapted to be driven thereby, a plurality of adjustable switch elements in said switch assembly, a plurality of resistance elements connected in a control circuit arrangement to be selectively and sequentially by-passed upon closing of the sequentially operated switches, said control circuit including a capacitance element connected in a manner to be charged by current flow through the resistance elements, a gas triode tube of a type having a starter anode operatively connected to receive the voltage of said capacitance sufficient to fire the tube at the expiration of said predetermined time-magnitude relationship, an electroresponsive mine detonator connected to cathode of said tube, and means connected to the anode of said tube for activating said detonator as the tube is fired, and a depth compensating bellows means operatively connected to the multiple switch assembly to change the adjustment of the switch elements thereof in response to pressure corresponding to depth of submergence of the mine.

12. A depth compensating pressure integrating device for controlling the detonating means of a submerged mine of a type which is selectively responsive to a predetermined code of pressure signals for operating a controlled electric circuit, comprising, a switch assembly having a plurality of sets of adjustable contact elements, a resistance-capacitance circuit including a plurality of branches of differing resistance connected to separate ones of said contact elements for providing a plurality of preselected time periods for charging the capacitor element thereof, a gas triode tube connected to said capacitor element, a depth compensating means comprising an expansible bellows connected to the switch assembly comprising an expansible bellows connected to the switch assembly and mounted in a manner to simultaneously adjust said sets of contact elements, and means including one of said sets of elements for providing a normal discharge path for a leakage charge on the capacitor.

13. A depth compensating pressure integrating device for controlling the detonating means of a submerged mine of a type which is selectively responsive to a predetermined code of pressure signals for operating a controlled electric circuit, a switch assembly having a plurality of sets of adjustable contact elements, a plurality of branches of differing resistance connected to separate ones of said contact elements for providing a plurality of preselected time periods when charging the capacitor element, a resistance-capacitance circuit connected through said plurality of branches to said separate ones of said switch elements including potential source means for charging the capacitor element thereof, a gas triode tube connected to said capacitor element in a manner to provide control for the detonating means of the mine, a depth compensating means comprising a first expansible bellows mounted in a manner to simultaneously adjust said sets of contact elements, a pressure responsive means adapted to be subjected to pressure signals and connected to actuate the switch contact elements, said connection being such as to provide sequential closing of the sets of contact elements, said pressure responsive means comprising an expansible bellows system of an externally arranged bellows and an internally arranged time delay bellows means mounted with the exterior thereof in a pressure chamber provided within the external bellows, a leak orifice connection from the exterior of the said pressure responsive means to the interior of the time delay bellows means and means including one of said sets of elements providing a normal discharge path for a leakage charge on the capacitor, said pressure responsive means being connected to the switch contact elements in a manner to disconnect the normal discharge path when the system is activated by the pressure responsive means in response to a pressure code signal of a predetermined value.

14. A depth compensating pressure integrating device for controlling the detonating means of a submerged mine of a type which is selectively responsive to a predetermined code of pressure signals for operating a controlled electric circuit, a switch assembly having a plurality of sets of adjustable contact elements, a resistance-capacitance circuit connected therewith and including means for charging the capacitor element thereof, a gas triode connected to said capacitor element in a manner to provide control for the detonating means of the mine, a depth compensating means comprising a first expansible bellows mounted in a manner to simultaneously adjust said sets of contact elements, a pressure responsive means adapted to be subjected to pressure signals and connected to actuate the switch contact elements, said connection being such as to provide sequential closing of the sets of contact elements, said pressure responsive means comprising an expansible bellows system of an externally arranged bellows and an internally arranged time delay bellows means mounted with the exterior thereof in a pressure chamber provided within the external bellows, a leak orifice connection from the exterior of said pressure responsive means to the interior of the time delaying bellows means, and means including one of said sets of elements providing a normal discharge path for a leakage charge on the capacitor, said pressure responsive means being connected to the switch contact element in a manner to disconnect the normal discharge path when the system is activated by the pressure responsive means in response to a pressure code signal of predetermined value, said resistance-capacitance filter circuit comprising, a plurality of resistance elements respectively connected with each set of switch contact elements, a capacitor connected to be charged at an increasing rate through the sets of switch elements as the pressure responsive means actuates additional contact elements in sequential order in response to an increasing code signal, the resistance elements being respectively cut out as the contacts close in sequence, one set of the switch contact elements being connected to control the normal discharge path for the leakage charge on the capacitor and arranged to open the circuit of the leakage path as the first of the charging circuit contact elements are engaged by action of the pressure responsive device, said resistance-capacitance circuit being capable of providing a voltage on the capacitor sufficient to fire the triode when a signal of a predetermined value is received thereby.

15. A pressure integrating device selectively responsive to a predetermined pressure code for operation thereof, comprising a switch controlled electrical circuit having a source of electrical potential, firing means connected in said circuit, pressure responsive means, a plurality of switch elements included in said circuit connected to said pressure responsive means for sequential operation thereof, a capacitor, a plurality of resistance elements serially connected through preselected switch elements in a predetermined pressure time-magnitude relationship, each of said resistance elements being connected across the terminals of one each respectively of the plurality of switch elements in an arrangement for sequentially altering the value of resistance through which the current flows to said capacitor, a gas triode tube having a starter anode, said capacitor being connected in a manner to discharge through said gas triode tube wherein the capacitor is connected in a manner to apply firing potential at the starter anode and to fire the triode tube after a predetermined flow of current through the resistance elements sufficient to charge the capacitor, and detonating means operatively connected in series with the anode-cathode circuit of the gas triode tube and adapted to be actuated as the triode tube is fired.

* * * * *